United States Patent [19]

Van Becelaere et al.

[11] Patent Number: 4,559,867
[45] Date of Patent: Dec. 24, 1985

[54] ROUND DAMPER AND FUSIBLE LINK THEREFOR

[75] Inventors: Robert M. Van Becelaere, Johnson County, Kans.; William J. Bailey, Jackson County, Mo.

[73] Assignee: Philips Industrial Components, Inc., Dayton, Ohio

[21] Appl. No.: 626,058

[22] Filed: Jun. 29, 1984

[51] Int. Cl.4 ............................................. F16K 17/40
[52] U.S. Cl. ........................................... 98/1; 137/75; 137/77; 251/305
[58] Field of Search ............................ 49/1, 5, 7; 98/1; 137/72, 75, 77; 251/58, 305, 308

[56] References Cited

U.S. PATENT DOCUMENTS 2,640,491  6/1953  MacBain ............................... 137/75
3,111,300  11/1963  Boone, Sr. ........................ 251/308 X
3,727,880  4/1973  Stock ................................. 137/72 X
4,432,272  2/1984  Becelaere ................................. 98/1

Primary Examiner—Harold Joyce
Attorney, Agent, or Firm—Kokjer, Kircher, Bradley, Wharton, Bowman & Johnson

[57] ABSTRACT

A transversely circular fire damper having a butterfly type blade operated by a jack shaft spaced longitudinally of the housing from the blade axle. Linkage including an "over center" stop rotates the blade in one direction by operation of a motor coupled with the shaft. A clutch in the form of a pair of relatively telescoped members secured together with entectic solder is connected with the jack shaft and the motor so that the shaft is released from the motor when the ambient temperature reaches a point high enough to melt the solder. The jack shaft is spring biased in a direction to close the damper blade under such condition.

4 Claims, 6 Drawing Figures

ROUND DAMPER AND FUSIBLE LINK THEREFOR

This invention pertains to fluid flow control dampers, and more particularly to novel construction of a damper such as is useful for protecting air conditioning ducts in case of fire. The damper of this invention is particularly provided for use in installations where the ductwork to be protected thereby is of transversely circular configuration.

Fire and smoke dampers have long been used as means for isolating certain building areas from other areas in case of the outbreak of fire within the building. For many years applicable building codes have specified that dampers which automatically close as a result of elevated temperature be installed in building ductwork at fire wall locations as a means for retarding the spread of fire through the ducts. More recently, due to information learned from the scientific study of the effects from fire and toxic smoke, attention has been given to the use of dampers of this general type to control the spread of toxic fumes throughout buildings. Often the worst consequences from fires and similar disasters result from smoke and fumes rather than the heat generated from the fire itself.

It is often the case that the heating and ventilating system of the building offers the best available means for evacuating such smoke and fumes from a building, thereby preventing harmful permeation throughout the building. The main blower apparatus of the system and the electrical power for its operation are often unaffected by a localized fire. It is desirable that the ductwork throughout the system be capable of selective isolation from a remote control location so that the system can be used for smoke and fume evacuation purposes.

In order the achieve such control over the system, it is desirable that protective dampers be capable of controlling the flow of smoke and fumes through the system as well as capable of the primary function of preventing the spread of flames through the building. It is also mandatory that the dampers be selectively openable or closable from a remote location when not in the fire region itself, but be capable of automatic closure under elevated temperature conditions to help prevent the spread of the flame to other parts of the building.

Heretofore, motor operated fire dampers have been suggested for these purposes. These have been dampers of rectangular construction utilizing a foldable protective screen or a plurality of louvers held in standby condition by a conventional fusible link comprised of two separable components. The rectangular configuration of such dampers minimizes the problems of providing satisfactory protective closures suitable for controlled and automatic operation, yet which are subject to relatively inexpensive manufacturing techniques from sheet metal material. Such dampers are entirely suitable for use in building where transversely rectangular ductwork is involved.

Many buildings are, however, provided with transversely circular ductwork for one reason or another. In so far as applicant is aware, no circular damper capable of meeting the rigorous standards of the industry for protective devices of this type, and also capable of selective controlled operation, have heretofore been available. This has resulted in the expensive and time consuming installation of transversely rectangular protective dampers into round ductwork. Such installations have not proven entirely satisfactory for the foregoing and a variety of other reasons.

Accordingly, it is a primary object of the present invention to provide a protective damper for round ductwork which damper is selectively openable or closable from remote locations, yet which is constructed in a manner for safe automatic operation to effectively close off the passage through the damper when subjected to the heat from a fire.

Another important object of the invention is to provide a damper which meets the rigid requirements for independent testing laboratory certification for protective dampers of this kind under simulated fire conditions, yet which may be economically manufactured from relatively inexpensive materials and can be easily installed in round ductwork.

A further object of the invention is to provide a damper having a simple butterfly type closure which is spring biased toward its closed position, yet which is normally held in the opened condition by a motor subject to controlled operation from a remote location.

Still another important object of this invention is to provide such a single blade fire damper constructed for selective operation of the blade through connecting linkage from operating components spaced longitudinally of the ducting from the blade axle, to permit the blade to be located in the plane of a building wall as may be required by applicable building codes, yet to permit the operating motor to be located away from the wall where sufficient clearance is likely to be available for installation and maintenance purposes.

Another object of the present invention is to provide a novel temperature responsive protective device particularly useful for shaft operated equipment such as the type contemplated by the present disclosure, so that the operating shaft is coupled in driving relationship with the control motor under normal conditions, and is automatically uncoupled therefrom when the temperature reaches a predetermined level.

These and other important aims and objectives of the present invention will be further explained or will become apparent from reading the appended claims and from the description of the drawings, wherein:

Figure 2:
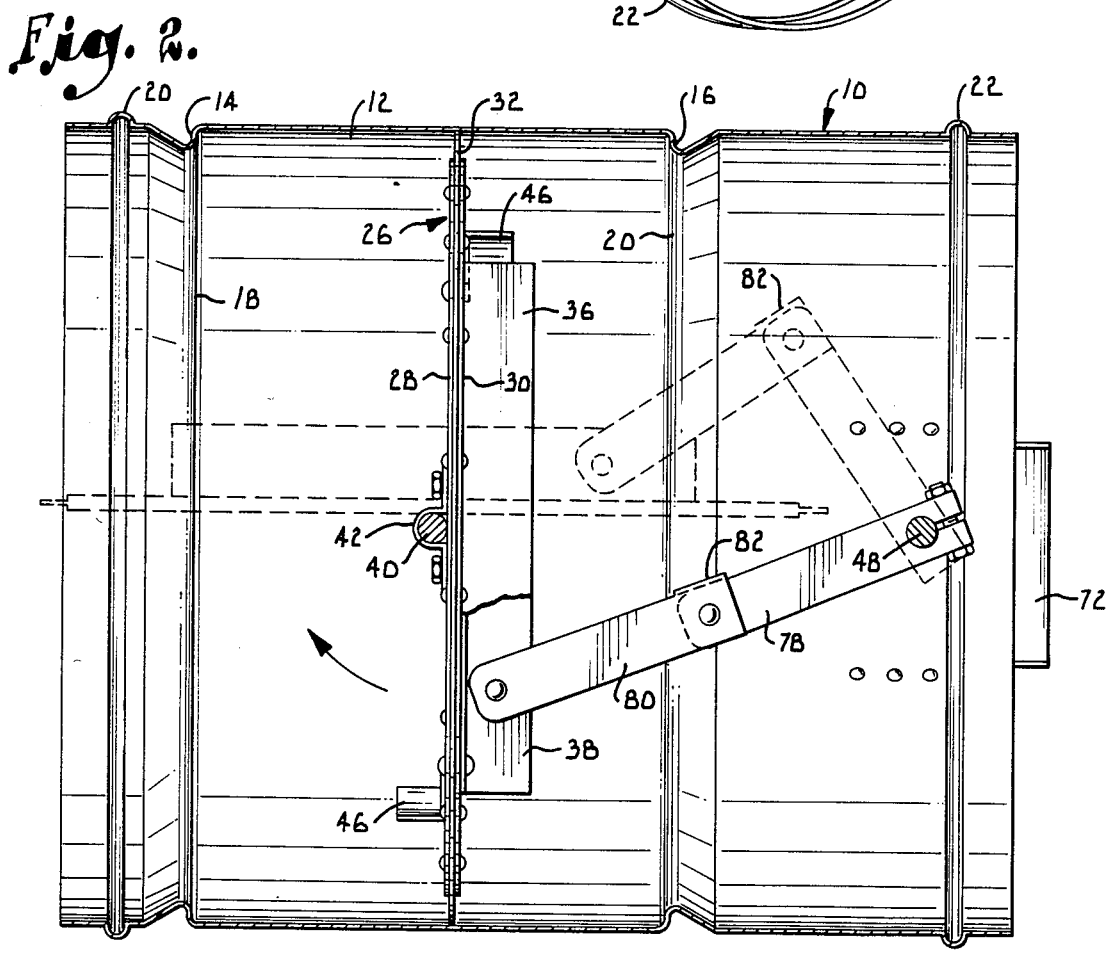
FIG. 2 is a detailed vertical cross-sectional view through the damper of FIG. 1, alternate positions for the closure and operating linkage being shown in dash lines.
Figure 3:
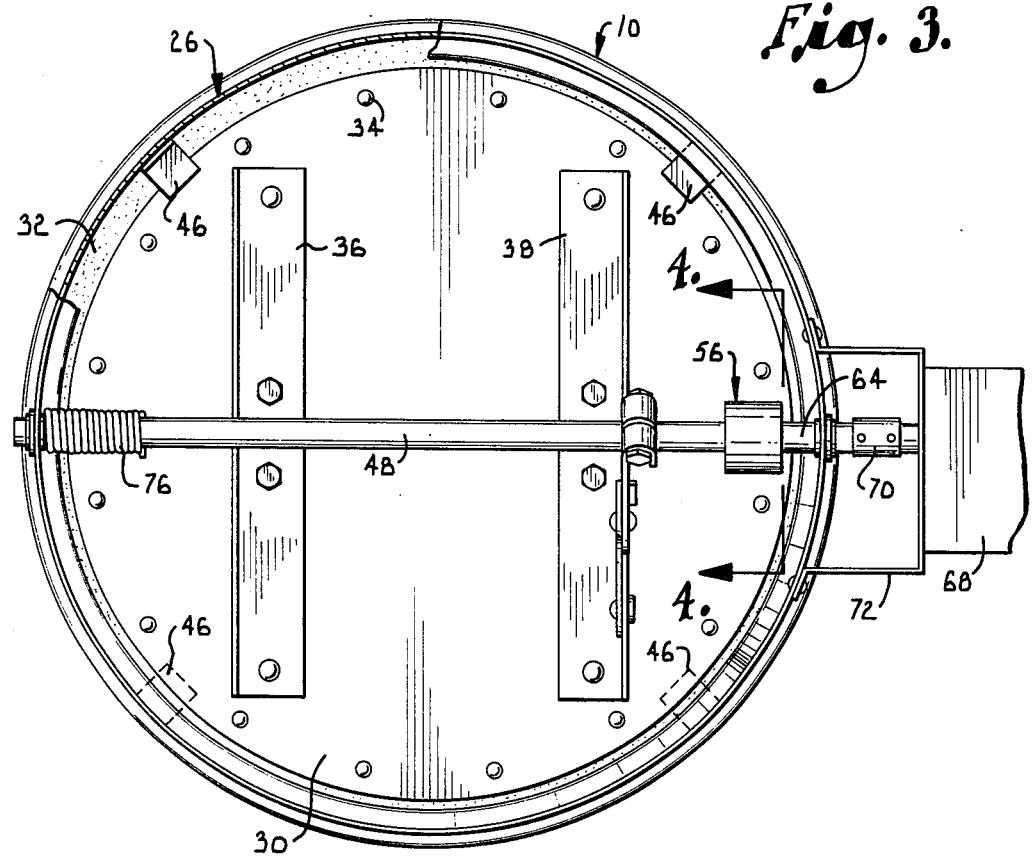
FIG. 3 is an end elevational view thereof, parts being broken away and shown in cross section to reveal details of construction.
Figure 4:
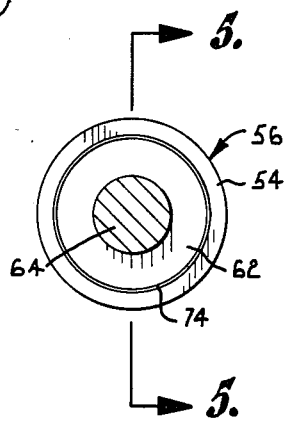
FIG. 4 is an enlarged, detailed cross-sectional view taken along line 4—4 of FIG. 3.

A damper embodying the principals of this invention is broadly designated by the reference numeral 10 and includes an elongated, transversely circular, tubular housing 12 preferably formed from initially flat sheet metal such as sheet steel or the like. In the preferred construction, housing 12 is first rolled into a tubular form and secured in this configuration. The tube is then subjected to a rolling operation where the sheet metal is caused to deform by a cold flow technique to provide longitudinally spaced apart, annular groves 14 and 16 in the tube sidewall as best shown in FIG. 2 of the drawing. Formation of the groves 14 and 16 provide spaced apart, annular restrictions 18 and 20 respectively in the longitudinal fluid passage defined by housing 12.

The bending of the metal of housing 12 to present groves 14 and 16 in the sidewall serve an important function of rendering the housing more rigid than it would be without the bend. The annular restrictions also serve another important function to be hereinafter described. The strengthening of the housing can be further increased by rolling annular ridges 22 and 24 through the metal and such ridges may serve as stops for the transversely circular ductwork which is telescoped over the ends of the housing when the damper is installed.

A transversely circular butterfly closure or blade 26 is interposed in the damper intermediate annular restrictions 18 and 20. Blade 26 preferably comprises a pair of transversely circular sheet metal plates 28 and 30 of slightly lesser diameter than the diameter of housing 12. An annular strip 32 of flexible sheet material having an outer perimeter edge substantially the same diameter as the interior diameter of housing 12 (as shown in FIG. 2) is sandwiched between plates 28 and 30. Strip 32 is secured by fasteners such as rivets 34 extending transversely through the plates and the sheet material at spaced intervals around the perimeter of the closure. Strip 32 is preferably of sheet silicone material due to the desirable heat resistance of such material and the strip serves as a seal to fully close the fluid passage through the housing 12 when the blade is in its closed position as illustrated in full lines in FIG. 2 of the drawing.

A pair of vertically extending, horizontally spaced apart angle stiffeners 36 and 38 are secured to one side of blade 26 and the latter is mounted on a horizontally extending transversely circular shaft 40 which projects through suitable openings in the sidewall of housing 12. A pair of u-shaped brackets 40 (only one of which is shown in FIG. 2) are secured to the blade to fasten the latter to the shaft with the shaft extending on the horizontal medial axis of the blade. A pair of annular retainers 44 (only one of which is shown in FIG. 2 hold the shaft and blade assembly in proper position within the housing so that the blade may swing from the closed position thereof to a full open position thereof as illustrated in dash lines in FIG. 2.

A plurality of L-shaped stops 46 are secured to the inner surface of housing 12 at circumferentially spaced apart locations to stop the blade in its closed position yet permit the blade to swing to its open position as will be readily understood by those skilled in the art.

A transversely circular shaft 48 extends across the interior of housing 12 in parallelism with shaft 40 and spaced therefrom longitudinally of the housing. One end of shaft 48 is rotatably received through an opening in housing 12 and is retained by an annular retainer 50. The other end of shaft 48 is telescoped into a recess 52 of a tubular element 54 of a fusible coupler or "link" broadly designated by the numeral 56. Element 54 is rigidly secured to shaft 48 by a pin 58 extending transversely through the element and through the shaft as shown best in FIGS. 5 and 6 of the drawing.

Figure 5:
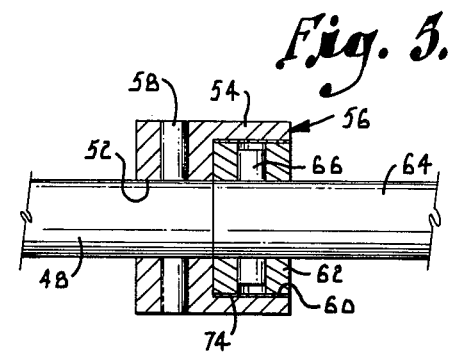
FIG. 5 is a cross-sectional view taken along line 5—5 of FIG. 4.
Figure 6:
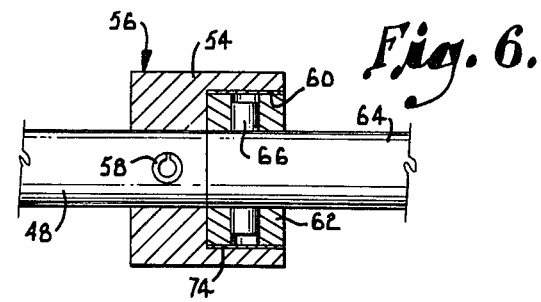
FIG. 6 is a view similar to FIG. 5, but illustrating relative rotation of the damper operating shaft with respect to the motor shaft as a result of the elevation of the ambient temperature to above a predetermined level.

Element 54 is provided with a bore 60 of substantially greater diameter than shaft 48 and in axial alignment with the latter. Member 62 having an outer peripheral surface configured to be complementally telescoped within bore 60 but of slightly lesser diameter than the latter is received within the bore and is, in turn, secured to one end of a stub shaft 64 by a pin 66 extending transversely through shaft 64 and member 62 as illustrated in FIGS. 5 and 6 of the drawing. Shaft 64 extends through the sidewall of housing 12 and is, in turn, coupled to a electric motor 68 by a coupler 70. Motor 68 is mounted exteriorly of housing 12 on a bracket 72 riveted to the housing.

Member 62 is configured to rotate freely within bore 60 of element 54. However, under normal conditions, member 60 is locked against relative rotation with respect to element 54 by solder 74 interposed between the outer peripheral surface of the member and the surface of the wall defining the perimeter of bore 60. This locks shaft 48 for rotating with shaft 64 under the influence of motor 68 coupled in driving relationship with shaft 64.

Preferably, element 54 and member 62 are constructed of brass to enhance the adhesion of the solder utilized for coupling the components together.

Figure 1:
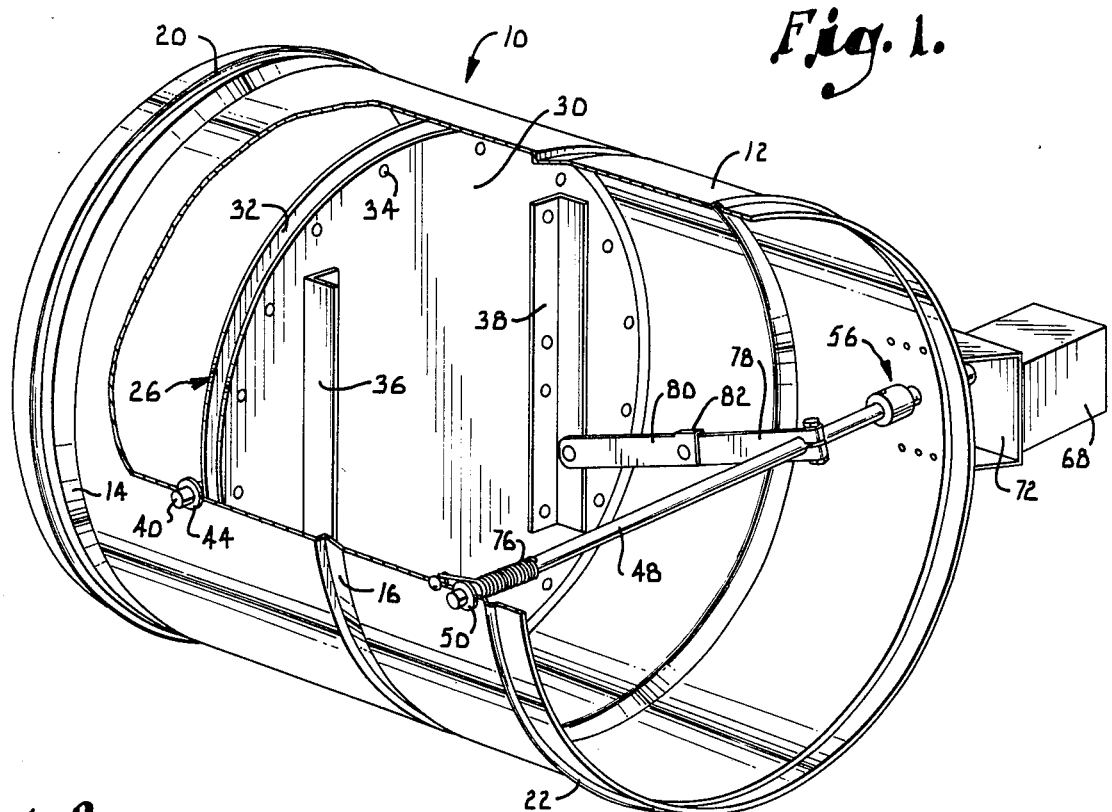
FIG. 1 is a perspective view illustrating a damper embodying the principals of this invention, parts being broken away to reveal details of construction.

A torsion spring 26 has one end thereof secured to shaft 48 and the other end secured to housing 12 is disposed over the shaft to provide a biasing force tending to rotate shaft 48 in a counterclockwise direction as viewed in FIGS. 1 and 2 of the drawing.

A crank arm 78 is rigidly secured to shaft 48 and projects radially therefrom. The end of arm 78 remote from shaft 48 is pivotally coupled to an elongated, rigid link 80 which is, in turn, pivotally coupled at its opposite end to angle 38 at a point spaced from shaft 40. Link 80 has a flange portion 82 integral with the link and projecting substantially normal to the plane thereof in position to serve as a stop to prevent the link and crank arm from traveling only slightly beyond the position of longitudinal alignment thereof when shaft 48 is rotated in one direction, but to permit a knee joint action between the two rigid members about the point of pivotal interconnection thereof when the shaft is rotated in the opposite direction. Thus, the rotation of the shaft in a clockwise direction as viewed in FIG. 2 of the drawing, against the bias of spring 76, moves the interconnected components to the position thereof shown in dash lines in the drawing. On the other hand, rotation of shaft 48 in the opposite direction moves the components to the position shown in full lines in FIG. 2 which is the closed position for the damper.

It should be pointed out that arm 78 and link 80 are not precisely in alignment at this position. Rather, there is a slight angle between the upper edges of the two components so that forces pushing against blade 26 would have a tendency to cause the knee joint to buckle in the opposite direction from the direction of buckling up the joint when shaft 48 is rotated in a clockwise direction. Such further buckling of the joint in a direction corresponding to counterclockwise rotation of shaft 48 is, of course, stopped by the projecting flange 82 of link 80. The "over center" position of the components of the linkage when the blade is in its full closed position is a safety feature to ensure against inadvertent opening of the blade irrespective of the application of substantial forces which may be applied to the blade from the opposite direction.

The damper embodying the principals of this invention may be quickly and conveniently installed in transversely circular ductwork. Most building codes require that the blade itself must be located within the plane of a fire wall. The wall openings designed for round ductwork often provide too little space to accommodate the motor which controls the blade position. Damper 10 is constructed so that motor 68 may be positioned outside the plane of the fire wall with the blade of the damper in the specified location.

Motor 68 is coupled with a source of electrical energy and may be controlled from the remote location such as a building control panel or the like. Motor 68 is normally energized to rotate shaft 48 in a direction to hold the damper in an open position as illustrated in dash lines in FIG. 2. Obviously, motor 68 can be selectively operated so that the blade may be moved into any intermediate position that may be desired. On the other hand, in the event of the outbreak of fire, a resultant elevation of the ambient temperature to a predetermined level causes the eutectic solder 74 within coupler 54 to melt. Upon melting, the solder loses the ability to lock member 62 to element 54 permitting the latter to rotate with shaft 48 under the influence of spring 76.

The bias of spring 76 is in a direction to close the damper blade and shut off the fluid flow passage through the damper housing when the solder melts in the coupler. Thus coupler 56 serves as a temperature responsive clutch between motor 68 and the damper closure. The relative telescoped pair of components comprising coupler 56 are ideally suited for the temperature responsive function required for shaft operated devices of this general nature. The use of coupler 56 obviates the necessity for more conventional, pull apart fusible links which are particularly ill suited for devices having shaft operated parts which move on arcuate paths of travel.

The annular restrictions 18 and 20 formed in the housing 12 reduce the effective diameter of the housing to slightly less than that of the metal discs or plates 28 and 30 of the damper blade. Under extreme heat conditions the flexible blade seal might be destroyed. Applicable specifications for protective dampers of this type often require that the damper maintain no line of sight openings longitudinally through the damper even if the damper seal should burn away. These restrictions provide overlapping metal structure in conjunction with the metal discs which serve this function.

The "over center" locked position of the blade linkage described above is particularly useful in insuring that the damper blade would remain in its closed conditions in the event of a fire, even though high pressure streams of water might be directed by firemen against the blade. Forces directed against the blade from the left as viewed in FIG. 1 would only tend to move the linkage in a further over center condition against the lock afforded by flange 82 of link 80. Were it not for such over center position, such forces might tend to move the components of the knee connection in the opposite direction resulting in the movement of the blade to its open position.

The fusible coupler 56 heretofore described in detail represents a substantial departure from conventional fusible links commonly used with protective fire and smoke dampers. All such conventional links, insofar as applicant is aware, comprise a pair of components which are physically separated when the temperature reaches a sufficiently high temperature to melt the solder binding the components together. As a result, it is necessary to install new links, once the original ones have become separated, before the devices can be put back into operation. This can prove to be a very substantial burden when one considers that devices of this type are quite often installed in locations where access to the device is relatively difficult.

On the other hand, the construction of coupler 56 is such that the liquid solder when melted is retained in the space between element 54 and member 60. Melting of the solder permits relative rotation of these components to permit the damper to close, but aside from such rotation, the components remain in telescoped relationship with the liquid solder interposed therebetween. Thus, when the ambient temperature lowers to the point that the solder hardens, the fusible coupler is thereby inherently restored to condition for its standby protective function.

A fire may elevate the temperature sufficient to activate the protective devices by melting the solder in the fusible couplers, yet may not reach a temperature great enough to otherwise physically damage the devices. Further, a fire in one part of a building may damage or destroy the device or devices in close proximity thereto, yet generate heat throughout other regions of the building sufficient to actuate the protective devices without damaging the latter. In such cases only the devices which are physically damaged need be replaced and the undamaged devices equipped with the novel couplers 56 can be returned to service from remote locations without the necessity for operator access to refit the devices with new fusible links.

We claim:

1. A fusible connector for use with a shaft operated fire damper to permit control of the damper closure position responsive to rotational torque applied to the shaft and to release the torque from the shaft permitting the latter to rotate for closing the damper when the temperature reaches a predetermined level, said connector comprising:

an element adapted to be rigidly secured to the shaft for rotation therewith, said element having a cylindrical bore therein extending in axial alignment with the shaft and projecting beyond the end of the latter, said bore being closed at one end with the open end of the bore facing outwardly from the end of the shaft;

a cylindrical member telescoped into the bore from the open end thereof and having an outer surface concentric with the wall of the bore and slidable with respect thereto;

means carried by the member for securing the latter to a torque source for rotating the member about the shaft axis; and solder means interposed between the member and the element normally intercoupling the same for rotation together as a unit under the influence of said torque, said solder means being meltable to permit relative rotation between the element and the member when the temperature reaches said predetermined level and being hardenable to reestablish the rigid connection between the element and the member when said temperature drops below the solidification temperature of said solder.

2. The invention of claim 1, wherein said element is of tubular construction, said element being adapted to be telescoped over one end of the shaft, the member being cylindrical and having an axial opening therethrough, and key means for the element and the member respectively, each of said key means being adapted to lock the corresponding element and member to the respective shaft and torque source.

3. A damper for selectively controlling fluid flow through transversely circular, tubular building duct work, said damper comprising:

- a cylindrical tubular housing having an axially extending flow passage therethrough, said housing being constructed of initially flat, relatively thin sheet metal bent upon itself and secured in said cylindrical configuration;
- the sheet metal of said housing being deformed inwardly to present a pair of inwardly directed ridges integral with the housing and extending circumferentially around the interior of the housing, each ridge comprising an annular restriction in the flow passage through the housing, said ridges being spaced apart longitudinally of the housing;
- a closure in the housing and configured to block said flow passage when the closure is in one position and to permit fluid flow through the passage when the closure is in another position, said closure comprising a sheet metal disc of lesser diameter than the diameter of said flow passage, and a strip of flexible sheet material carried by the disc and projecting radially outwardly from the periphery of the disc, said strip having a circular periphery engaging the inner surface of the housing when the closure is in said flow blocking position;
- axis means extending transversely of the housing and pivotally mounting the closure between the annular ridges of the housing for swinging movement of the closure between said positions thereof;
- elongated, rigid stiffener means secured to on surface of the disc to prevent buckling of the latter under the influence of substantial forces directed against the disc; and
- selectively operable power means operably coupled with the closure for swinging the latter between said positions, whereby the inwardly directed ridges in the housing impart structural rigidity to the housing and restrict the diameter of the flow passage through the housing to less than the diameter of the flexible strip periphery to minimize the possibility for the closure diameter to be reduced to less than the diameter of the flow passage in the event of damage to the peripheral edge of the flexible strip under conditions of extreme heat applied to the damper.

4. The damper of claim 3, wherein said disc includes a pair of superposed, flat sheet metal plates, said flexible strip being sandwiched between the plates, and means securing the plates together with the strip projecting radially outwardly from the periphery of the plates.

* * * * *